US005580671A

United States Patent [19]

Tamari et al.

[11] Patent Number: 5,580,671
[45] Date of Patent: Dec. 3, 1996

[54] PERPENDICULAR MAGNETIC FILM AND MULTI-LAYERED FILM FOR PERPENDICULAR MAGNETIC FILM

[75] Inventors: Kousaku Tamari, Hiroshima; Takanori Doi, Hatsukaichi, both of Japan

[73] Assignee: Toda Kogyo Corporation, Japan

[21] Appl. No.: 110,822

[22] Filed: Aug. 24, 1993

[30] Foreign Application Priority Data

Aug. 26, 1992 [JP] Japan .................................. 4-252276

[51] Int. Cl.$^6$ ...................................... G11B 5/66
[52] U.S. Cl. ................. 428/694 T; 428/694 TS; 428/694 TM; 428/900
[58] Field of Search .................. 428/694 T, 694 TS, 428/694 TM, 900

[56] References Cited

U.S. PATENT DOCUMENTS

| | | | |
|---|---|---|---|
| 4,748,073 | 5/1988 | Sagoi | 428/213 |
| 4,797,330 | 1/1989 | Nasu | 428/694 T |
| 5,080,948 | 1/1992 | Morita | 428/65.3 |
| 5,290,589 | 3/1994 | Clough | 427/126.3 |
| 5,326,637 | 7/1994 | Nasu | 428/336 |
| 5,352,501 | 10/1994 | Miyamoto | 428/65.7 |

FOREIGN PATENT DOCUMENTS

| | | |
|---|---|---|
| 0122030 | 10/1984 | European Pat. Off. . |
| 0351815 | 1/1990 | European Pat. Off. . |

OTHER PUBLICATIONS

Japanese Patent Application Laid-Open (Kokai) No. 51-119999 (1976).
Japanese Patent Application Laid-Open (Kokai) No. 63-47359 (1988).
Japanese Patent Application Laid-Open (Kokai) No. 3-17813 (1991).
Japanese Patent Application Laid-Open (Kokai) No. 3-188604 (1991).
Japanese Patent Application Laid-Open (Kokai) No. 4-10509 (1992).
Japanese Patent Application Laid-Open (Kokai) No. 62-267949(1987).
Japanese Patent Application Laid-Open (Kokai) No. 5-166167 (1993).

IEEE Translation Journal on Magnetics in Japan, vol. 6, No. 9, Sep. 1991, Ishii et al: "Magnetization Reversal Mechanism in $\gamma$-Fe$_2$O$_3$ Thin Films", pp. 730–736.

IEEE Translation Journal on Magnetics in Japan, vol. 6, No. 9, Sep. 1991, Horii et al: "Magnetic Recording Characteristics of Co Ferrite Perpendicular Aanisotropy Film," pp. 765–770.

Primary Examiner—Leszek Kiliman
Attorney, Agent, or Firm—Nixon & Vanderhye

[57] ABSTRACT

Disclosed herein is a perpendicular magnetic film comprising a Co-containing $\gamma$-Fe$_2$O$_3$ film formed on a substrate in which the plane (400) is predominantly oriented in parallel with said substrate, the molar ratio of Co to Fe is between 0.01 and 0.32, the spacing of said plane (400) is not more than 2.084 Å, and the optical absorption coefficient at 700 nm is not more than 2.5 $\mu m^{-1}$.

12 Claims, 7 Drawing Sheets

PERPENDICULAR MAGNETIC FILM AND MULTI-LAYERED FILM FOR PERPENDICULAR MAGNETIC FILM

BACKGROUND OF THE INVENTION

The present invention relates to a perpendicular magnetic film and a multi-layered film for a perpendicular magnetic film. More particularly, the present invention relates to a perpendicular magnetic film composed of Co-containing $\gamma$-Fe$_2$O$_3$ which is suitable as a perpendicular magnetic recording material and which has an excellent oxidation resistance, an excellent corrosion resistance, a large coercive force, a large squareness, a large Faraday rotation angle $\theta_F$ and a small optical absorption coefficient $\alpha$ and, hence, a large figure of merit, and to a multi-layer film used as a precursor for such a perpendicular magnetic film.

With recent remarkable demand for miniaturization and higher reliability of information processing devices and systems, perpendicular magnetic films as a high-density recording medium have been rapidly developed and put to practical use. A perpendicular magnetic film has an easy magnetization axis perpendicular to the film surface, in other words, perpendicular magnetic anisotropy, and it is required to have excellent coercive force Hc and squareness (residual magnetization $\sigma$r/saturation magnetization $\sigma$s).

In addition, since the magnetic characteristics of a magnetic recording medium are deteriorated due to oxidation by the oxygen in the air, the perpendicular magnetic film is required to be stable against oxidation.

When a perpendicular magnetic film is used as a medium for magneto-optical recording in which recording and reproduction of information is carried out by using an optical beam such as a laser beam, the medium is required to have excellent magneto-optical characteristics such as a Faraday rotation angle $\theta_F$, an optical absorption coefficient $\alpha$ (when the ratio of the intensity I$_1$ of the light which has transmitted a material having a film thickness of t to the intensity I$_0$ of incident light, namely, the transmittance (I$_1$/I$_0$) is assumed to be exp ($-\alpha$t)) and a figure of merit (2|$\theta_F$|/$\alpha$). With the recent increasing demand for higher-density recording, a growing tendency is shown that the recorded carrier signals have a high frequency, in other words, that the recorded carrier signals have a shorter wavelength. The wavelength of a light source which is used for magneto-optical recording at present is 830 nm or 780 nm, but for the purpose of higher-density recording in the future, semiconductor lasers having a wavelength of 670 nm, 640 nm, 532 nm, 490 nm, etc. are considered as a light source.

In the case of magneto-optical recording, the diameter of a recorded bit is determined by the wavelength of a laser beam, and the shorter the wavelength, the smaller the bit diameter becomes. A material whose Faraday rotation angle has a large dependence on the wavelength in a short wavelength region of not more than 780 nm, is therefore strongly demanded.

An amorphous alloy thin film such as a Gd-Co film and a Tb-Fe film composed of a rare earth metal and a transition metal, a spinel oxide thin film such as a cobalt ferrite film (Japanese Patent Application Laid-Open (KOKAI) Nos. 51-119999 (1976), 63-47359 (1988), 3-17813 (1991), 3-188604 (1991) and 4-10509 (1992)); a magnetoplumbite oxide thin film such as a barium ferrite film (Japanese Patent Application Laid-Open (KOKAI) No. 62-267949 (1987)) and a substitutional garnet thin film have been proposed as perpendicular magnetic oxide thin films for magneto-optical recording.

Among the above-described perpendicular magnetic films, the cobalt ferrite film which is typical of spinel oxides films are stable against oxidation because it is an oxide, it has a high coercive force due to the large crystalline magnetic anisotropy, and it has a large Faraday rotational angle $\theta_F$ in a short wavelength range in the vicinity of 800 nm and 500 nm. Owing to these magnetic characteristics a cobalt ferrite film is considered to be promising as a magneto-optical recording medium.

As the process for producing a cobalt ferrite (CoFe$_2$O$_4$) film, various methods such as a sputtering method, a vacuum evaporation method and a MOCVD method are known. Among these, a sputtering method is mainly adopted. The sputtering method, however, is disadvantageous in that although the easy magnetization axis of a cobalt ferrite (CoFe$_2$O$_4$) film is in the plane (400), the easy magnetization axis is likely to orient at random or the plane (111) is likely to oriented in parallel with the substrate, so that it is difficult to produce a perpendicular magnetic film and it is impossible to obtain a large coercive force and a large squareness. As a method for obtaining a cobalt ferrite (CoFe$_2$O$_4$) film in which the plane (400) is predominantly oriented in parallel with the substrate, (1) the method described in *Digits 9th Annual Conf. Magnetics Japan*, p315, (2) the method described in *Digits 13th Annual Conf. Magnetics Japan*, p 246, and (3) the method described in Japanese Patent Application Laid-Open (KOKAI) No. 4-10509 (1992), for example, are known.

The method (1) is a method of depositing Fe and Co ionized in an oxygen plasma on an MgAl$_2$O$_4$ substrate or a silica glass substrate which is heated to a temperature of 500° C. Since it is necessary to maintain the substrate temperature at a high temperature such as not lower than 500° C. during film formation, the productivity is poor. In addition, since the material of the substrate is limited, it is industrially and economically disadvantageous.

The method (2) is a plasma-exciting MO-CVD method. Since it is necessary to maintain the substrate temperature of 300° to 400° C. in a vacuum during film formation, the productivity is poor, which is industrially and economically disadvantageous.

The method (3) is a method of annealing a multi-layered metal film obtained by laminating at least two layers of Co and Fe at a temperature of not lower than 500° C. in an atmosphere containing oxygen. Since a high temperature is necessary, the material of the substrate is limited, which is disadvantageous both industrially and economically.

Although a perpendicular magnetic film which is composed of a spinel oxide and which has an excellent oxidation resistance, an excellent corrosion resistance, a large coercive force, a large squareness, a large Faraday rotational angle $\theta_F$ and a small optical absorption coefficient $\alpha$, and hence, a large figure of merit, is now in the strongest demand, none of the conventional magnetic thin films sufficiently meet these requirements.

Since the cobalt ferrite (CoFe$_2$O$_4$) film is an oxide, it is stable against oxidation, has a large coercive force due to the crystalline anisotropy which increases with the increase in the Co content, and a large Faraday rotational angle $\theta_F$ in the vicinity of 800 nm and 500 nm. However, the cobalt ferrite (CoFe$_2$O$_4$) film is disadvantageous in that the optical absorption coefficient $\alpha$ at 700 nm is as large as about 3.5 to 7.0 µm$^{-1}$, so that the figure of merit (2|$\theta_F$|/$\alpha$) is small when using a laser beam having a wavelength of not more than 700 nm.

Especially, in order to maintain the substrate temperature at not less then 500° C., the heat resistance of the substrate itself is required, but the heat resistance of polycarbonate, epoxy resin, etc. which are generally used as a material of the substrate is insufficient. Since the material of the substrate is thus limited, it is disadvantageous both industrially and economically.

A magnetic recording medium using an oxide layer as a primary layer has been proposed in Japanese Patent Application Laid-Open (KOKAI) Nos. 3-17813 (1991), 5-12765 (1993) and 5-166167 (1993).

Japanese Patent Application Laid-Open (KOKAI) No. 5-166167 (1993) discloses a fixed magnetic disk obtained by forming a Co-Zn ferrite film having a spinel crystalline structure in which the plane (100) is predominantly oriented in parallel with the substrate on an NiO film having an NaCl-type crystalline structure.

In the fixed magnetic disk, Co ferrite film is formed on an NiO primary layer so as to accelerate crystalline orientation in the plane (100), but the spacing (2.09 Å) of plane (100) of the NiO layer is smaller than the spacing (not less than 2.10 Å) of the plane (400) of the $Co_xZn_yFe_{3-x-y}O_4$ layer. When the lattice constant of a primary film is larger than that of a Co ferrite film, the perpendicular anisotropy is generally accelerated, while it is reduced when the lattice constant of a primary film is smaller than that of a Co ferrite film, as shown in Japanese Patent Application Laid-Open (KOKAI) Nos. 3-17813 (1991). The fixed magnetic disk disclosed in Japanese Patent Application Laid-Open (KOKAI) No. 5-166167 (1993), therefore, has a small perpendicular anisotropy.

Accordingly, the present invention aims at the industrially and economically advantageous production of a perpendicular magnetic film which is composed of a spinel oxide, and which has an excellent oxidation resistance, an excellent corrosion resistance, a large coercive force, a large squareness, a large Faraday rotational angle $\theta_F$ in a short wavelength region and a small optical absorption coefficient $\alpha$, and hence, a large figure of merit, at a temperature of not higher than 500° C. and as low as possible.

As a result of various studies undertaken by the present inventors so as to attain the above aims, it has been found that a perpendicular magnetic film comprising a substrate and a Co-containing $\gamma$-$Fe_2O_3$ film formed on the substrate in which the plane (400) is predominantly oriented in parallel with the substrate, the Co content is 0.01 to 0.32 mol based on 1 mol of Fe, the spacing of the plane (400) is not more than 2.084, and the optical absorption coefficient at 700 nm is not more than 2.5 $\mu m^{-1}$ obtained by annealing at a temperature of 280° to 450° C. a multi-layered film for a perpendicular magnetic film comprising a multiplicity of units formed on the substrate, each unit being composed of an $Fe_3O_4$ layer and a CoO layer laminated with one on top of the other, in which the plane (400) is predominantly oriented in parallel with the substrate, one unit has a thickness of not more than 130 Å and the molar ratio of Co to Fe is between 0.01 and 0.32, the perpendicular magnetic film has not more than 2.5 $\mu m^{-1}$ of an the optical absorption coefficient at 700 nm and shows an excellent oxidation resistance, an excellent corrosion resistance, a large coercive force, a large squareness, a large Faraday rotational angle $\theta_F$ and a small optical absorption coefficient $\alpha$, and hence, a large figure of merit at 700 nm. On the basis of this finding, the present invention has been achieved.

SUMMARY OF THE INVENTION

It is an object of the present invention to provide a perpendicular magnetic film which is composed of a spinel oxide and which has an excellent oxidation resistance, an excellent corrosion resistance, a large coercive force, a large squareness, a large Faraday rotational angle in a short wavelength region, a small optical absorption coefficient $\alpha$, and hence, a large figure of merit ($2|\theta_F|/\alpha$).

It is another object of the present invention to provide a multi-layered film as a precursor of a perpendicular magnetic film which is composed of a spinel oxide and which has an excellent oxidation resistance, an excellent corrosion resistance, a large coercive force, a large squareness, a large Faraday rotational angle in a short wavelength region, a small optical absorption coefficient $\alpha$, and hence, a large figure of merit ($2|\theta_F|/\alpha$), in order to industrially produce the perpendicular magnetic film at a temperature of not higher than 500° C. and as low as possible.

In a 1st aspect of the present invention, there is provided a perpendicular magnetic film comprising a Co-containing $\gamma$-$Fe_2O_3$ film formed on a substrate in which the plane (400) is predominantly oriented in parallel with said substrate, the molar ratio of Co to Fe is between 0.01 and 0.32, the spacing of said plane (400) is not more than 2.084 Å, and the optical absorption coefficient at 700 nm is not more than 2.5 $\mu m^{-1}$.

In a 2nd aspect of the present invention, there is provided a multi-layered film for a perpendicular magnetic film, comprising a multiplicity of units formed on a substrate, each unit being composed of an $Fe_3O_4$ layer and a CoO layer laminated with one on top of the other, in which the plane (400) is predominantly oriented in parallel with said substrate, the thickness of one unit is not more than 130 Å and the molar ratio of Co to Fe is between 0.01 and 0.32.

In a 3rd aspect of the present invention, there is provided the perpendicular magnetic film according to 1st aspect, obtained by annealing the multi-layered film as defined in 2nd aspect at a temperature of 280° to 450° C.

In a 4th aspect of the present invention, there is provided a perpendicular magnetic film comprising: a primary layer of an NiO film formed on a substrate in which the plane (100) is predominantly oriented in parallel with said substrate; and a Co-containing $\gamma$-$Fe_2O_3$ film formed on said primary layer, in which the plane (400) is predominantly oriented in parallel with said substrate, the molar ratio of Co to Fe is between 0.10 and 0.32, the spacing of said plane (400) is not more than 2.084 Å, and the optical absorption coefficient at 700 nm is not more than 2.5 $\mu m^{-1}$.

In a 5th aspect of the present invention, there is provided a multi-layered film for a perpendicular magnetic film, comprising a primary layer of an NiO film formed on a substrate, in which the plane (100) is predominantly oriented in parallel with said substrate; and a multiplicity of units formed on said primary layer, each unit being composed of an $Fe_3O_4$ layer and a CoO layer laminated with one on top of the other, in which the plane (400) is predominantly oriented in parallel with said substrate, the thickness of one unit is not more than 800 Å, and the molar ratio of Co to Fe is between 0.10 and 0.32.

In a 6th aspect of the present invention, there is provided the perpendicular magnetic film according to 4th aspect, obtained by annealing the multi-layered film as defined in 5th aspect at a temperature of 280° to 450° C.

In a 7th aspect of the present invention, there is provided a perpendicular magnetic film according to 1st aspect, wherein said Co-containing $\gamma$-$Fe_2O_3$ film formed on said substrate in which said plane (400) is predominantly oriented in parallel with said substrate, contains 0.01 to 0.25 mol of Mn based on 1 mol of Co.

In an 8th aspect of the present invention, there is provided a multi-layered film for a perpendicular magnetic film, comprising a multiplicity of units formed on a substrate, each unit being composed of an $Fe_3O_4$ layer and an oxide layer containing Co and Mn laminated with one on top of the other, in which the plane (400) is predominantly oriented in parallel with said substrate, the molar ratio of Mn to Co is between 0.01 and 0.25, the molar ratio of Co to Fe is between 0.01 and 0.32, and the thickness of one unit is not more than 130 Å.

In a 9th aspect of the present invention, there is provided the perpendicular magnetic film according to 7th aspect, obtained by annealing the multi-layered film as defined in 8th aspect at a temperature of 280° to 450° C.

In a 10th aspect of the present invention, there is provided a perpendicular magnetic film comprising: a primary layer of an NiO film formed on a substrate in which the plane (100) is predominantly oriented in parallel with said substrate; and a Co-Mn-containing $\gamma$-$Fe_2O_3$ film formed on said primary layer, in which the plane (400) is predominantly oriented in parallel with said substrate, the molar ratio of Co to Fe is between 0.10 and 0.32, the molar ratio of Mn to Co is between 0.01 and 0.25, the spacing of said plane (400) is not more than 2.084 Å, and the optical absorption coefficient at 700 nm is not more than 2.5 $\mu m^{-1}$.

In an 11th aspect of the present invention, there is provided a multi-layered film for a perpendicular magnetic film, comprising a primary layer of an NiO film formed on a substrate in which the plane (100) is predominantly oriented in parallel with said substrate; and a multiplicity of units formed on said primary layer, each unit being composed of an $Fe_3O_4$ layer and an oxide layer containing Co and Mn laminated with one on top of the other, in which the plane (400) is predominantly oriented in parallel with said substrate, the thickness of one unit is not more than 800 Å, the molar ratio of Co to Fe is between 0.10 and 0.32, and the molar ratio of Mn to Co is between 0.01 and 0.25.

In a 12th aspect of the present invention, there is provided the perpendicular magnetic film according to 10th aspect, obtained by annealing the multi-layered film as defined in 11th aspect at a temperature of 280° to 450° C.

In a 13th aspect of the present invention, there is provided a process of producing a perpendicular magnetic film as defined in 1st aspect, comprising the step of annealing at a temperature of 280° to 450° C. a multi-layered film composed of a multiplicity of units formed on a substrate, each unit being composed of an $Fe_3O_4$ layer and a CoO layer laminated with one on top of the other, in which the plane (400) is predominantly oriented in parallel with said substrate, the thickness of one unit is not more than 130 Å, and the molar ratio of Co to Fe is between 0.01 and 0.32.

In a 14th aspect of the present invention, there is provided a process of producing a perpendicular magnetic film as defined in 4th aspect, comprising the step of annealing at a temperature of 280° to 450° C. a multi-layered film composed of a primary layer of an NiO film formed on a substrate in which the plane (100) is predominantly oriented in parallel with the said substrate, and a multiplicity of units formed on said primary layer, each unit being composed of an $Fe_3O_4$ layer and a CoO layer laminated with one on top of another, in which the plane (400) is predominantly oriented in parallel with said substrate, the thickness of one unit is not more than 800 Å, and the molar ratio of Co to Fe is between 0.10 and 0.32.

In a 15th aspect aspect of the present invention, there is provided a process of producing a perpendicular magnetic film as defined in 7th aspect, comprising the step of annealing at a temperature of 280° to 450° C. a multi-layered film composed of a multiplicity of units formed on a substrate, each unit being composed of an $Fe_3O_4$ layer and an oxide layer containing Co and Mn laminated with one on top of the other, in which the plane (400) is predominantly oriented in parallel with said substrate, the molar ratio of Mn to Co is between 0.01 and 0.25, the molar ratio of Co to Fe is between 0.01 and 0.32, and the thickness of one unit is not more than 130 Å.

In a 16th aspect aspect of the present invention, there is provided a process of producing a perpendicular magnetic film as defined in 10th aspect, comprising the step of annealing at a temperature of 280° to 450° C. a multi-layered film composed of a primary layer of an NiO film formed on a substrate in which the plane (100) is predominantly oriented in parallel with said substrate, and a multiplicity of units formed on said primary layer, each unit being composed of an $Fe_3O_4$ layer and an oxide layer containing Co and Mn laminated with one on top of the other, in which the plane (400) is predominantly oriented in parallel with said substrate, the thickness of one unit is not more than 800 Å, the molar ratio of Co to Fe is between 0.10 and 0.32, and the molar ratio of Mn to Co is between 0.01 and 0.25.

DETAILED DESCRIPTION OF THE INVENTION

Figure 1A:
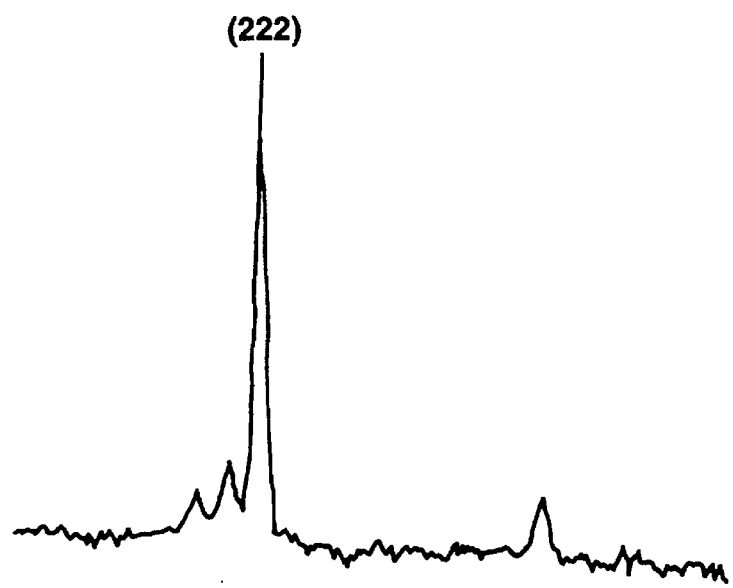
FIGS. 1a to 1c show X-ray diffraction spectra of multi-layer films.

A first embodiment of a perpendicular magnetic film according to the present invention is a Co-containing $\gamma$-$Fe_2O_3$ film formed on a substrate in which the plane (400) is predominantly oriented in parallel with the substrate, the Co content is 0.01 to 0.32 mol, preferably 0.05 to 0.30 mol, more preferably 0.1 to 0.26 mol based on 1 mol of Fe, the spacing of the plane (400) is not more than 2.084 Å, preferably 2.072 to 2.082 Å, and the optical absorption coefficient at 700 nm is not more than 2.5 µm$^{-1}$, preferably 0.5 to 2.2 µm$^{-1}$.

If the molar ratio of Co to Fe is less than 0.01, it is difficult to obtain a spinel oxide film in which the plane (400) is predominantly oriented in parallel with the substrate. In order to facilitate the production of a spinel oxide film in which the plane (400) is predominantly oriented in parallel with the substrate, the molar ratio of Co to Fe is preferably not less than 0.05. On the other hand, if the molar ratio of Co to Fe exceeds 0.32, it is difficult to transform $Fe_3O_4$ into γ-$Fe_2O_3$ at a temperature of not higher than 450° C. In addition, the optical absorption coefficient increases, so that the figure of merit is lowered.

When the spacing of the plane (400) of a perpendicular magnetic film exceeds 2.084 Å, the magnetostrictive anisotropy is small, so that it is difficult to obtain a perpendicular magnetic film having a large coercive force.

The thickness of a perpendicular magnetic film according to the present invention is 500 to 5,000 Å.

The first embodiment of a perpendicular magnetic film according to the present invention is produced by annealing a multi-layered film which is composed of a multiplicity of units formed on a substrate, each unit being composed of an $Fe_3O_4$ layer and a CoO layer laminated with one on top of the other, and in which the plane (400) is predominantly oriented in parallel with the substrate, the thickness of one unit is not more than 130 Å, preferably 30 to 100 Å, and the molar ratio of Co to Fe is between 0.01 and 0.32, preferably between 0.05 and 0.30, more preferably between 0.1 and 0.26, at a temperature of 280° to 450° C., preferably 290° to 400° C. The annealing time is preferably 0.8 to 5 hours.

The multi-layered film as the precursor of a perpendicular magnetic film of the present invention is composed of a multiplicity of units formed on a substrate, each unit being composed of an $Fe_3O_4$ layer and a CoO layer laminated with one on top of the other, and is obtained by a well-known method such as a reactive sputtering method in which metal targets (Fe and Co) are sputtered in an oxidizing atmosphere, a direct method in which an oxidized film is directly formed from sintered targets of $Fe_3O_4$ and $Co_3O_4$, and a reactive evaporation method in which metals (Fe and Co) are evaporated in an oxidizing atmosphere.

As the material of the substrate usable in the present invention, a metal such as Al, an Al alloy and stainless steel; and a glass such as soda glass, borosilicate glass, barium borosilicate glass and aluminosilicate glass may be exemplified. The thickness of the substrate is 0.1 to 2 mm.

In the multi-layered film of the present invention, the thickness of one unit is not more than 130 Å, preferably 30 to 100 Å, and the molar ratio of Co to Fe is between 0.01 and 0.32. It is impossible to obtain a perpendicular magnetic film aimed at in the present invention, in case of using a multi-layered film in which the thickness of one unit exceeds 130 Å or a multi-layered film in which the molar ratio of Co to Fe is less than 0.1 or more than 0.32.

The multi-layered film of the present invention is composed of at least three units, preferably 5 to 150 units, each unit being composed of an $Fe_3O_4$ layer and a CoO layer laminated with one on top of the other. Since the thickness of a perpendicular magnetic film is about not more than 5000 Å in practical use, the number of units is determined so as to produce a film of a desired thickness.

The annealing temperature of the multi-layered film of the present invention is 280° to 450° C. preferably 290° to 400° C. If the annealing temperature is lower than 280° C., the transformation of $Fe_3O_4$ into γ-$Fe_2O_3$ or diffusion of Co is insufficient for obtaining a perpendicular magnetic film of the present invention. If the annealing temperature exceeds 450° C., the transformation of γ-$Fe_2O_3$ into α-$Fe_2O_3$ begins to be caused, so that it is impossible to produce a perpendicular magnetic film aimed at in the present invention.

In annealing, the transformation temperature for transforming $Fe_3O_4$ into γ-$Fe_2O_3$ is lowered by adding Cu to the film, as described in, for example, Japanese Patent Application Laid-Open (KOKAI) No. 57-54309 (1982). It is possible to produce a similar effect by adopting this method in the present invention. Annealing may be carried transformed $Fe_3O_4$ into γ-$Fe_2O_3$ at a temperature of 240° to 320° C. and Co is then diffused at a temperature of 280° to 450° C. In this case, it is possible to suppress the production of a crack which is likely to be caused during the transformation of $Fe_3O_4$ into γ-$Fe_2O_3$.

What is the most important in the first embodiment is that the perpendicular magnetic film of the present invention is produced by annealing at a temperature of 280° to 450° C. a multi-layered film, which is composed of a multiplicity of units formed on a substrate, each unit being composed of an $Fe_3O_4$ layer and a CoO layer laminated with one on top of the other, and in which the plane (400) is predominantly oriented in parallel with the substrate, one unit is of not more than 130 Å in thickness, and the molar ratio of Co to Fe is between 0.01 and 0.32.

A second embodiment of a perpendicular magnetic film of the present invention is composed of a primary layer of an NiO film formed on a substrate in which the plane (100) is predominantly oriented in parallel with the substrate, and a Co-containing γ-$Fe_2O_3$ film formed on the primary layer in which the plane (400) is predominantly oriented in parallel with the substrate, the molar ratio of Co to Fe is between 0.10 and 0.32, preferably 0.10 to 0.26, the spacing of the plane (400) is not more than 2.084 Å, preferably 2.072 to 2.082 Å, and the optical absorption coefficient at 700 nm is not more than 2.5 µm$^{-1}$, preferably 0.5 to 2.2 µm$^{-1}$.

The thickness of the NiO layer as a primary layer is 500 to 2,000 Å, and the thickness of the Co-containing γ-$Fe_2O_3$ film is 500 to 5,000 Å.

The second embodiment of a perpendicular magnetic film is produced in the following methods.

(i) An NiO layer as a primary layer in which the plane (100) is predominantly oriented in parallel with a substrate is formed on the substrate, and a Co-containing $Fe_3O_4$ layer is formed on the primary layer. In the Co-containing $Fe_3O_4$ layer, the molar ratio of Co to Fe is between 0.10 and 0.32, preferably between 0.10 and 0.26. The two-layered film obtained is annealed at a temperature of 280° to 450° C., preferably at 290° to 400° C. to form the perpendicular magnetic film composed of a Co-containing γ-$Fe_2O_3$ film and NiO layer. The annealing time is preferably 0.8 to 5 hours.

(ii) A multi-layered film composed of an NiO layer as a primary layer formed on a substrate in which the plane (100) is predominantly oriented in parallel with the substrate, and a multiplicity of units formed on the NiO layer, each unit being composed of an $Fe_3O_4$ layer and a CoO layer laminated with one other, in which the plane (100) is predominantly oriented in parallel with the substrate, one unit of the laminated films composed of $Fe_3O_4$ layers and CoO layers is of not more than 800 Å in thickness, preferably 30 to 500 Å in thickness, and the molar ratio of Co to Fe is between 0.10 and 0.32, preferably between 0.10 and 0.26 is annealed at a temperature of 280° to 450° C., preferably at 290° to 400° C. The annealing time is preferably 0.8 to 5 hours. The process for producing the perpendicular magnetic film from the multilayered film described above is preferred in view of the perpendicular magnetic film having small grain size and a high S/N ratio.

It is sometimes impossible to obtain a homogeneous Co-containing $\gamma$-$Fe_2O_3$ layer by using a laminated film composed of an $Fe_3O_4$ layer and a CoO layer in which the thickness of one unit exceeds 800 Å, since Co ions do not diffuse into a $\gamma$-$Fe_2O_3$ layer, sufficiently. Also, it is sometimes impossible to obtain a perpendicular magnetic film aimed at in the present invention by using a laminated film composed of an $Fe_3O_4$ layer and a CoO layer, in which the molar ratio of Co to Fe is less than 0.10.

The spacing of the plane (100) of the NiO layer as a primary layer of the second embodiment of a perpendicular magnetic film is 2.090 Å and the spacing of the plane (400) of the Co-containing $\gamma$-$Fe_2O_3$ layer is not more than 2.084 Å. This means that the provision of an NiO layer as a primary layer rather develops a tendency of increasing the perpendicular anisotropy as compared with the perpendicular anisotropy of a perpendicular magnetic film obtained by using ferrite having the spacing of the plane (400) larger than that of the NiO layer, as shown in Japanese Patent Application Laid-Open (KOKAI) No. 5-166167, in addition to the tendency of accelerating the crystalline orientation of the plane (400) of the Co-containing $\gamma$-$Fe_2O_3$ layer.

A third embodiment of a perpendicular magnetic film according to the present invention is a Co-Mn-containing $\gamma$-$Fe_2O_3$ film formed on a substrate in which the plane (400) is predominantly oriented in parallel with the substrate, the molar ratio of Co to Fe is 0.01 to 0.32, preferably 0.10 to 0.26, the molar ratio of Mn to Co is 0.01 to 0.25, preferably 0.03 to 0.08, the spacing of the plane (400) is not more than 2.084 Å, preferably 2.072 to 2.082 Å, and the optical absorption coefficient at 700 nm is not more than 2.5 $\mu m^{-1}$, preferably 0.5 to 2.2 $\mu m^{-1}$.

The thickness of the Co-Mn-containing $\gamma$-$Fe_2O_3$ film is 500 to 5,000 Å.

The third embodiment of a perpendicular magnetic film according to the present invention is produced by annealing a multi-layered film comprising a multiplicity of units formed on a substrate, each unit being composed of an $Fe_3O_4$ layer and an oxide layer containing Co and Mn laminated with one on top of the other, in which the plane (400) is predominantly oriented in parallel with the substrate, the molar ratio of Mn to Co is between 0.01 and 0.25, preferably 0.03 and 0.08, the molar ratio of Co to Fe is between 0.01 and 0.32, preferably between 0.10 and 0.26, the thickness of one unit is not more than 130 Å, preferably 30 to 100 Å, at a temperature of 280° to 450° C., preferably 290° to 400° C. The annealing time is preferably 0.8 to 5 hours.

A fourth embodiment of a perpendicular magnetic film of the present invention is composed of a primary layer of an NiO film formed on a substrate in which the plane (100) is predominantly oriented in parallel with the substrate and a Co-Mn-containing $\gamma$-$Fe_2O_3$ film formed on the primary layer in which the plane (400) is predominantly oriented in parallel with the substrate, the molar ratio of Co to Fe is between 0.10 and 0.32, preferably between 0.10 and 0.26, the molar ratio of Mn to Co is between 0.01 and 0.25, preferably between 0.03 and 0.08, the spacing of the plane (400) is not more than 2.084 Å, preferably 2.072 to 2.082 Å, and the optical absorption coefficient at 700 nm is not more than 2.5 $\mu m^{-1}$, preferably 0.5 to 2.2 $\mu m^{-1}$.

The thickness of the NiO layer is 500 to 2,000 Å, and the thickness of the Co-Mn-containing $\gamma$-$Fe_2O_3$ film is 500 to 5,000 Å.

The fourth embodiment of a perpendicular magnetic film is produced in the following methods.

(i) An NiO layer as a primary layer in which the plane (100) is predominantly oriented in parallel with a substrate is formed on the substrate, and a Co-Mn-containing $Fe_3O_4$ layer is formed on the primary layer. In the Co-Mn-containing $Fe_3O_4$ layer, the molar ratio of Co to Fe is between 0.10 and 0.32, preferably between 0.10 and 0.26. The two-layered film obtained is annealed at a temperature of 280° to 450° C., preferably at 290° to 400° C. The annealing time is preferably 0.8 to 5 hours.

(ii) A multi-layered film composed of an NiO layer as a primary layer formed on a substrate in which the plane (100) is predominantly oriented in parallel with the substrate, and a multiplicity of units formed on the NiO layer, each unit being composed of an $Fe_3O_4$ layer and an oxide layers containing Co and Mn layer laminated with one on top of the other, in which the plane (400) is predominantly oriented in parallel with a substrate, one unit of the laminated layers composed of $Fe_3O_4$ layers and oxide layers containing Co and Mn is of not more than 800 Å in thickness, preferably 30 to 500 Å in thickness, the molar ratio of Co to Fe is between 0.10 and 0.32, preferably between 0.10 and 0.26, and the molar ratio of Mn to Co is between 0.01 and 0.25, preferably between 0.03 and 0.08, is annealed at a temperature of 280° to 450° C., preferably at 290° to 400° C. The annealing time is preferably 0.8 to 5 hours. The process for producing the perpendicular magnetic film from the multi-layered film described above is preferred in view of the perpendicular magnetic film having a small grain size and a high S/N ratio.

Figure 1B:
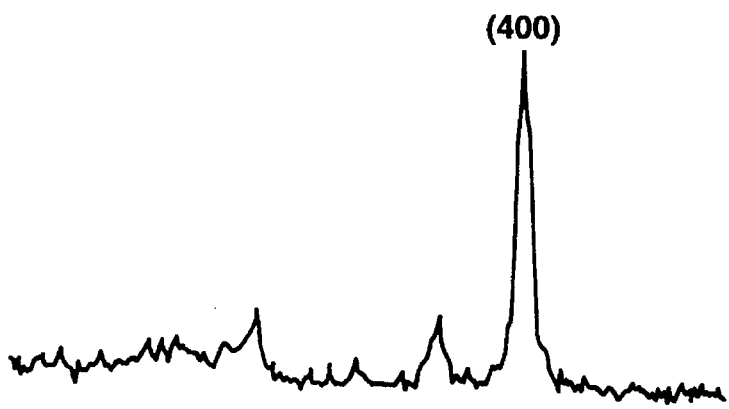

The present inventors have confirmed that it is impossible to obtain a perpendicular magnetic film aimed at in the present invention either by using a multi-layered film in which the plane (222) is predominantly oriented in parallel with the substrate in case where the thickness of one unit composed of $Fe_3O_4$ layer and the CoO layer exceeds 130 Å even if the molar ratio of Co to Fe is in the range of 0.01 to 0.32, or by using a multi-layered film in which the molar ratio of Co to Fe is out of the range of 0.01 to 0.32 even if the thickness of one unit composed of $Fe_3O_4$ layer and CoO layer is not more than 130 Å and the plane (400) is predominantly oriented in parallel with the substrate, as shown in Comparative Examples 1 and 2 which will be described later and in FIGS. 1a and 1b.

The perpendicular magnetic film of the present invention has a coercive force as large as not less than 3 kOe, preferably not less than 3.5 kOe, more preferably not less than 5 kOe, and a squareness as large as not less than 0.7, preferably not less than 0.75.

The reason why the perpendicular magnetic film of the present invention has a large coercive force is considered to be as follows.

A conventional cobalt ferrite ($CoFe_2O_4$) film produces a large coercive force by utilizing the crystalline magnetic anisotropy. In contrast, in the perpendicular magnetic film of the present invention, the plane (400) is predominantly oriented in parallel with the substrate, and the spacing of the plane (400) is not more than 2.084 Å, preferably 2.072 to 2.082 Å which is even smaller than 2.086 Å which is the spacing of the plane (400) of $\gamma$-$Fe_2O_3$ having the smallest spacing of all the spinel crystal structures mainly composed of Fe.

From these facts, the present inventors consider that the magnetostrictive anisotropy due to the strain is imparted to the perpendicular magnetic film of the present invention in addition to the crystalline magnetic anisotropy.

It has been confirmed that the contraction of (400) spacing of the perpendicular magnetic film of the present invention is caused not by the shrinkage or the like of the substrate but due to the film itself from the fact that the spacing of the film produced by transforming a monolayer $Fe_3O_4$ film (2000 Å) in which the plane (222) is oriented in parallel with the same glass substrate as that of the perpendicular magnetic film of the present invention into a $\gamma$-$Fe_2O_3$ film was 2.407 Å, which is approximately the same as 2.408 Å of the bulk value.

Although it is conventionally considered that by providing an NiO layer between a substrate and a recording layer, the perpendicular anisotropy is reduced, since the spacing of the plane (400) of Co-containing $\gamma$-$Fe_2O_3$ layer is smaller than that of the plane (100) of NiO layer, the perpendicular anisotropy of a perpendicular magnetic film according to the present invention is rather increased. Accordingly, the squareness is also increased.

In addition, it is possible to produce a recording layer not only by annealing a laminated film composed of a multiplicity of $Fe_3O_4$ layers and CoO layers as a precursor, but also by annealing a Co-containing $Fe_3O_4$ layer as a precursor.

In the case of using a laminated film as a precursor, it is possible to make a large unit having a thickness of not more than 800 Å, the production is facilitated and the productivity is greatly enhanced.

If Mn as well as Co is contained in a recording layer, the squareness is increased. Especially, when an NiO layer is provided as a primary layer and a Co-Mn-containing $\gamma$-$Fe_2O_3$ is formed thereon, the tendency of increasing the squareness is prominent.

The perpendicular magnetic film of the present invention has as large a Faraday rotational angle as conventional cobalt ferrite ($CoFe_2O_4$) film, and has such a small optical absorption coefficient a especially at a wavelength of 700 nm as 2.5 $\mu m^{-1}$ preferably 0.5 to 2.2 $\mu m^{-1}$ which results in a large figure of merit ($2|\theta_F|/\alpha$) at 700 nm.

This will be explained in the following with reference to drawings.

Figure 2:
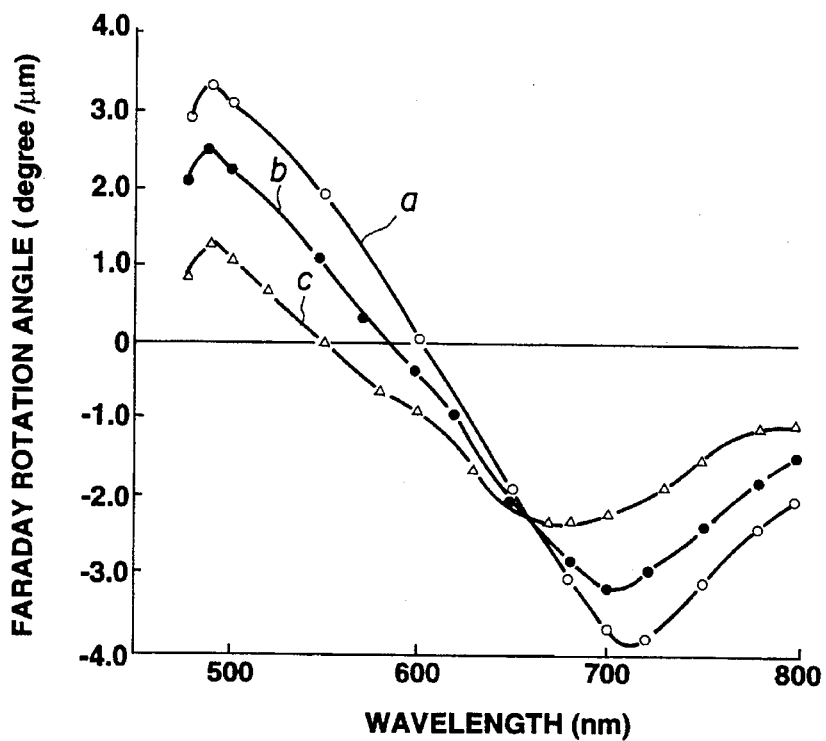
FIG. 2 shows the relationship between the Faraday rotational angle of a perpendicular magnetic film and the measuring wavelength.

FIG. 2 shows the relationship between the Faraday rotational angles of the perpendicular magnetic films produced in Examples 1, 3 and 4 which are described later and the wavelength of measuring light. In FIG. 2, the curves a, b and c represent the Faraday rotational angles of the perpendicular magnetic films produced in Examples 1, 3 and 4, respectively. As shown in FIG. 2, the Faraday rotational angle with respect to light wavelength changes with a change in the ratio of cobalt and iron. The smaller is the ratio of Co to Fe, the shorter the frequency is at which the Faraday rotational angle changes from a negative value to a positive value. In contrast, in the perpendicular magnetic film of the present invention, it is possible to freely control the Faraday rotational angle in correspondence with the light wavelength by varying the ratio of cobalt and iron.

Figure 3:
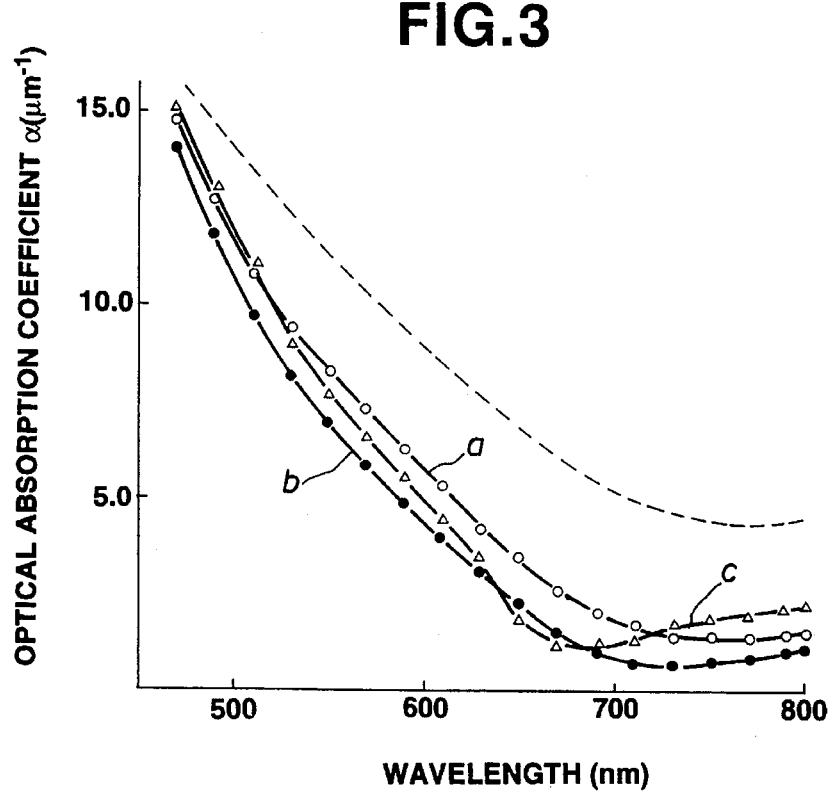
FIG. 3 shows the relationship between the optical absorption coefficient of a perpendicular magnetic film and the measuring wavelength.

FIG. 3 shows the relationship between the optical absorption coefficients of perpendicular magnetic films according to the present invention and a conventional cobalt ferrite ($CoFe_2O_4$) film, and the measuring wavelength of measuring light.

In FIG. 3, the curves a, b and c represent the optical absorption coefficients of the perpendicular magnetic films produced in Examples 1, 3 and 4, respectively, and the broken line shows that of a conventional cobalt ferrite ($CoFe_2O_4$) film.

The optical absorption coefficient of a conventional cobalt ferrite ($CoFe_2O_4$) film is extracted and plotted from the description at p 773 of *IEEE Transactions On Magnetics* MAG-vol 12 (1976).

As shown in FIG. 3, the optical absorption coefficients of the perpendicular magnetic films of the present invention are much smaller than that of the conventional cobalt ferrite ($CoFe_2O_4$) film.

Figure 4:
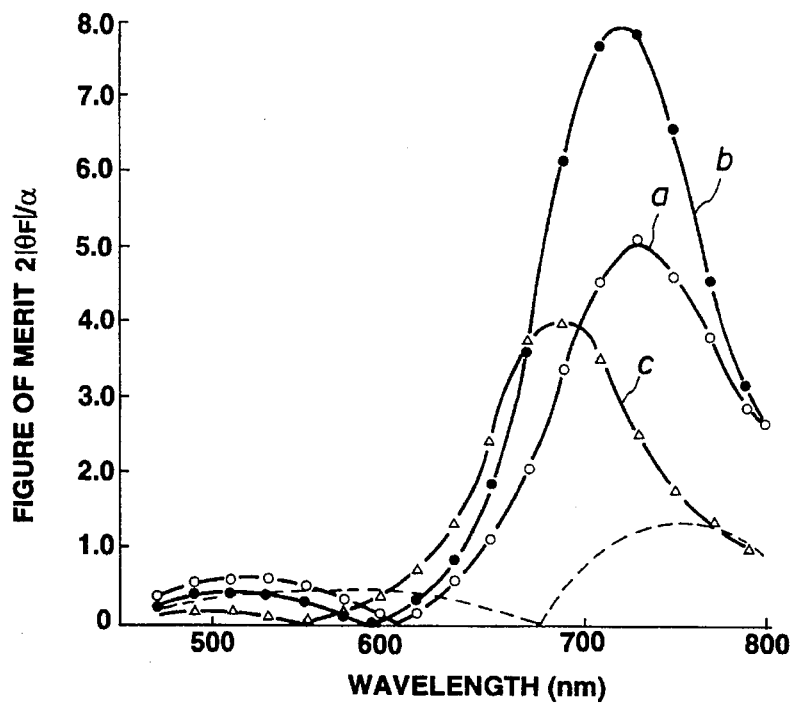
FIG. 4 shows the relationship between the figure of merit of a perpendicular magnetic film and the measuring wavelength.

FIG. 4 shows the relationship between the figure of merits ($2|\theta_F|/\alpha$) of perpendicular magnetic films according to the present invention and a conventional cobalt ferrite film, and the measuring wavelength of measuring light.

In FIG. 4, the curves a, b and c represent the figure of merits of the perpendicular magnetic films produced in Examples 1, 3 and 4, respectively, and the broken line shows that of a conventional cobalt ferrite ($CoFe_2O_4$) film. The figure of merit of a conventional cobalt ferrite ($CoFe_2O_4$) film is obtained by incorporating the optical absorption coefficient shown in FIG. 3 into the general formula of the figure of merit described in *IEEE Transactions on Magnetics* MAG-vol 12 (1976) and plotting the calculated values.

As shown in FIG. 4, the perpendicular magnetic film of the present invention has a small optical absorption coefficient and, hence, a large figure of merit. The perpendicular magnetic film of the present invention is therefore suitable as a magneto-optical recording medium.

In the perpendicular magnetic film of the present invention, the spacing of the plane (400) is not more than 2.084 Å. As to the magnetic characteristics thereof, the saturation magnetization is not less than 270 emu/cc, preferably not less than 330 emu/cc, the coercive force is not less than 4.0 kOe, preferably not less than 4.5 kOe, and the squareness is not less than 0.7, preferably not less than 0.75. The optical absorption coefficient thereof at 700 nm is not more than 2.5 $\mu m^{-1}$, preferably 0.5 to 2.2 $\mu m^{-1}$, and the figure of merit at 700 nm is not less than 1.0, preferably not less than 2.0.

In the perpendicular magnetic film of the present invention which uses an NiO layer as a primary layer, the spacing of the plane (400) is not more than 2.084 Å, the saturation magnetization is not less than 270 emu/cc, preferably not less than 326 emu/cc, the coercive force is not less than 3.0 kOe, preferably not less than 5.0 kOe, the squareness is not less than 0.75, preferably not less than 0.80, the optical absorption coefficient thereof at 700 nm is not more than 2.2 $\mu m^{-1}$, preferably not more than 1.9 $\mu m^{-1}$, and the figure of merit at 700 nm is not less than 1.0, preferably not less than 2.0.

In the perpendicular magnetic film of the present invention comprising Co-Mn-containing $\gamma$-$Fe_2O_3$ layer, the spacing of the plane (400) is not more than 2.084 Å, the saturation magnetization is not less than 270 emu/cc, preferably not less than 330 emu/cc, the coercive force is not less than 4.5 kOe, preferably not less than 5.0 kOe, the squareness is not less than 0.75, preferably not less than 0.80, the optical absorption coefficient thereof at 700 nm is not more than 2.2 $\mu m^{-1}$, preferably not more than 1.9 $\mu m^{-1}$, and the figure of merit at 700 nm is not less than 1.0, preferably not less than 2.0.

In the perpendicular magnetic film of the present invention comprising Co-Mn-containing $\gamma$-$Fe_2O_3$ layer which uses an NiO layer as a primary layer, the spacing of the plane (400) is not more than 2.084 Å, the saturation magnetization is not less than 270 emu/cc, preferably not less than 330 emu/cc, the coercive force is not less than 4.0 kOe, preferably not less than 5.0 kOe, the squareness is not less than 0.85, preferably not less than 0.90, the optical absorption coefficient thereof at 700 nm is not more than 2.2 $\mu m^{-1}$ preferably not more than 1.9 $\mu m^{-1}$, and the figure of merit at 700 nm is not less than 1.0, preferably not less than 2.0.

Since the perpendicular magnetic film of the present invention comprises a Co-containing γ-Fe$_2$O$_3$ film which has an excellent oxidation resistance, an excellent corrosion resistance, a large coercive force, a large squareness, a large Faraday rotation angle θ$_F$ and a small optical absorption coefficient α, and hence, a large figure of merit, the film is especially suitable as a magneto-optical recording medium.

According to a method of producing a perpendicular magnetic film of the present invention, it is not necessary to heat the substrate to not less than 300° C. during film formation in a vacuum, and it is possible to produce a perpendicular magnetic film by annealing at a low temperature such as less than 500° C. The method of the present invention is therefore very advantageous both industrially and economically.

EXAMPLES

The present invention will be explained in more detail hereinunder with reference to the following examples and comparative examples.

In the following examples and comparative examples, the magnetic characteristics were measured by using a "Vibration sample magnetometer VSM-3S-15", produced by Toei Kogyo K.K. The wavelength dependency of the Faraday rotation angle was measured by a "spectral Kerr Faraday measuring apparatus BH-M800", produced by Nihon Kagaku Engineering K.K.

The crystalline orientation was examined by the X-ray diffraction spectrum obtained by using an X-ray diffraction apparatus, rotating anode type "RIGAKU RU 300" (wavelength: 1.5418 Å, ordinary output 50 kv/240 nmA), produced by Rigaku Denki K.K.

The optical absorption coefficient was expressed by the value measured by a multi-purpose recording spectrophotometer MPS 2000 produced by Shimazu Seisakusho Ltd.

The figure of merit was expressed by the value calculated from the general formula 2|θ$_F$|/α by inserting the measured value of the optical absorption coefficient thereinto.

Example 1

Figure 1C:
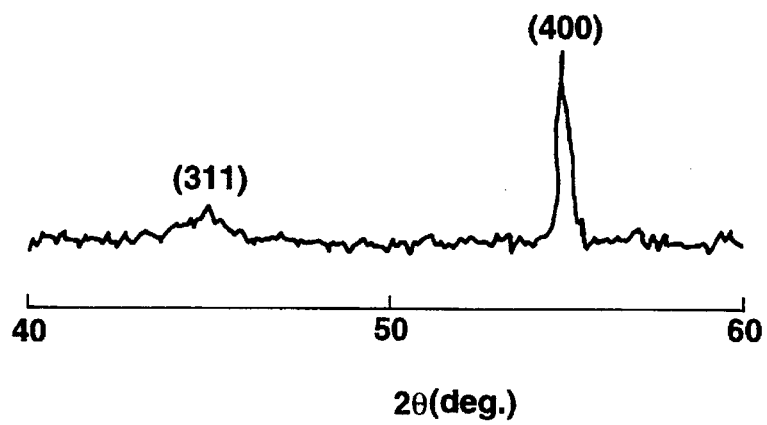

In a high-frequency high-rate sputtering device SH-250H-T06(manufactured by Nippon Shinku Corp.) a glass substrate was placed with a distance of 80 μm from an Fe target and a Co target and the substrate temperature was held at a temperature of 280° C. Reactive sputtering was first carried out by using the Fe target in an atmosphere of argon and oxygen under a partial oxygen pressure of 0.11 mTorr and the total pressure of 5 mTorr at a deposition rate of 40 Å/min, thereby forming a spinel Fe$_3$O$_4$ film on the glass substrate to a thickness of 40 Å as a first layer. The shutter was next rotated to form a spinel CoO film to a thickness of 7 Å as a second layer by sputtering the Co target at a deposition rate of 42 Å/min. The first layer and the second layer constituted one unit having a thickness of 47 Å. The molar ratio of Co to Fe in one unit was 0.26. These operations were alternately repeated 100 times to obtain a laminated film composed of 50 layers of spinel Fe$_3$O$_4$ films each having a thickness of 40 Å, and 50 layers of spinel CoO films each having a thickness of 7 Å. The making power at the time of film formation was 300 W on the Fe side and 300 W on the Co side. In the thus-obtained multi-layered film, the plane (400) was predominantly oriented in parallel with the substrate, as shown in the X-ray diffraction spectrum in FIG. 1(c).

Figure 5:
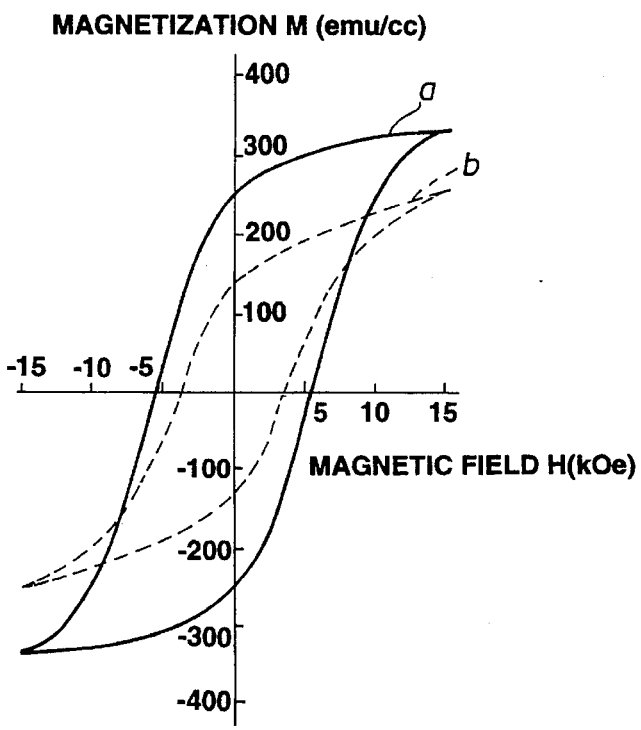
FIG. 5 shows the magnetization curve of the perpendicular magnetic film obtained in Example 1.

The multi-layered film was annealed in the air at a temperature of 450° C. for one hour so as to oxidize Fe$_3$O$_4$ into γ-Fe$_2$O$_3$ and diffuse Co, thereby producing a Co-containing γ-Fe$_2$O$_3$ film. As a result of the X-ray diffraction of the Co-containing γ-Fe$_2$O$_3$ film obtained, the plane (400) was proved to predominantly orient in parallel with the substrate. The magnetization curve of the film is shown in FIG. 5. In FIG. 5, the solid line a shows the magnetization curve of the film to which a magnetic field was applied in the perpendicular direction, and the broken line b shows the magnetization curve of the film to which a magnetic field was applied in the in-plane direction. As shown in FIG. 5, since the residual magnetization and the coercive force of the solid line a were larger than those of the broken line b, the film was recognized as a perpendicular magnetic film. As to the magnetic characteristics of the perpendicular magnetic film, the saturation magnetization was 340 emu/cc (4250 G), the coercive force was 5.4 kOe and the squareness was 0.75. The spacing of the plane (400) was 2.082 Å, the optical absorption coefficient at 700 nm was 1.9 μm$^{-1}$ and the figure of merit at 700 nm was 4.0. Thus, the film was proved to be a good perpendicular magnetic film.

Example 2

The multi-layered film obtained in the same way as in Example 1 was annealed in the air at a temperature of 400° C. for one hour so as to oxidize Fe$_3$O$_4$ into γ-Fe$_2$O$_3$ and diffuse Co, thereby producing a Co-containing γ-Fe$_2$O$_3$ film. As a result of the X-ray diffraction of the Co-containing γ-Fe$_2$O$_3$ film obtained, the plane (400) was proved to predominantly orient in parallel with the substrate. From the observation of the magnetization curve of the film, it was found that the residual magnetization and the coercive force of the film to which a magnetic field was applied in the perpendicular direction were larger than those of the film to which a magnetic field was applied in the in-plane direction. Thus, the film was recognized as a perpendicular magnetic film. As to the magnetic characteristics of the perpendicular magnetic film, the saturation magnetization was 342 emu/cc (4300 G), the coercive force was 6.7 kOe and the squareness was 0.76. The spacing of the plane (400) was 2.075 Å, the optical absorption coefficient at 700 nm was 1.9 μm$^{-1}$ and the figure of merit at 700 nm was 4.0. Thus, the film was proved to be a good perpendicular magnetic film.

Example 3

Reactive sputtering was first carried out by using an Fe target in an atmosphere of argon and oxygen under a partial oxygen pressure of 0.11 mTorr and the total pressure of 5 mTorr at a deposition rate of 40 Å/min, thereby forming a spinel Fe$_3$O$_4$ film on the glass substrate which was held at 200° C. to a thickness of 40 Å as a first layer. The shutter was next rotated to form a spinel CoO film to a thickness of 5 Å as a second layer by sputtering the Co target at a deposition rate of 28 Å/min. The first layer and the second layer constituted one unit having a thickness of 45 Å. The molar ratio of Co to Fe in one unit was 0.19. These operations were alternately repeated 100 times to obtain a laminated film composed of 50 layers of spinel Fe$_3$O$_4$ films each having a thickness of 40 Å, and 50 layers of spinel CoO films each having a thickness of 5 Å. The making power at the time of film formation was 300 W on the Fe side and 200 W on the Co side. In the thus-obtained multi-layered film, the plane (400) was predominantly oriented in parallel with the substrate.

Figure 6:
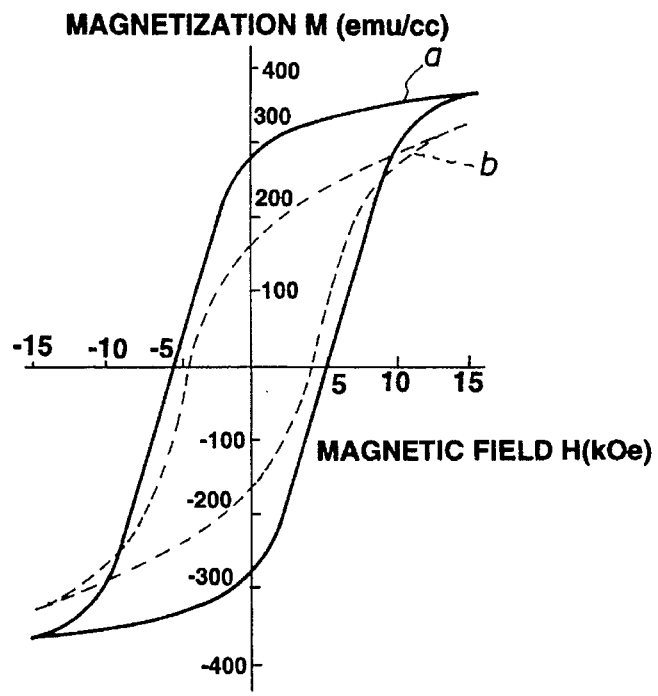
FIG. 6 shows the magnetization curve of the perpendicular magnetic film obtained in Example 3.

The multi-layered film was annealed in the air at a temperature of 400° C. for one hour so as to oxidize $Fe_3O_4$ into $\gamma$-$Fe_2O_3$ and diffuse Co, thereby producing a Co-containing $\gamma$-$Fe_2O_3$ film. As a result of the X-ray diffraction of the Co-containing $\gamma$-$Fe_2O_3$ film obtained, the plane (400) was proved to predominantly orient in parallel with the substrate. The magnetization curve of the film is shown in FIG. 6. In FIG. 6, the solid line a shows the magnetization curve of the film to which a magnetic field was applied in the perpendicular direction, and the broken line b shows the magnetization curve of the film to which a magnetic field was applied in the in-plane direction. As shown in FIG. 6, since the residual magnetization and the coercive force of the solid line a were larger than those of the broken line b, the film was recognized as a perpendicular magnetic film. As to the magnetic characteristics of the perpendicular magnetic film, the saturation magnetization was 350 emu/cc (4400 G), the coercive force was 5.2 kOe and the squareness was 0.78. The spacing of the plane (400) was 2.081 Å, the optical absorption coefficient at 700 nm was 0.8 $\mu m^{-1}$ and the figure of merit at 700 nm was 7.4. Thus, the film was proved to be a good perpendicular magnetic film.

Example 4

Reactive sputtering was first carried out by using an Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ film on the glass substrate which was held at a temperature of 160° C. to a thickness of 62 Å as a first layer. The shutter was next rotated to form a spinel CoO film to a thickness of 4 Å as a second layer by sputtering the Co target at a deposition rate of 28 Å/min. The first layer and the second layer constituted one unit having a thickness of 66Å. The molar ratio of Co to Fe in one unit was 0.09. These operations were alternately repeated 100 times to obtain a laminated film composed of 50 layers of spinel $Fe_3O_4$ films each having a thickness of 62 Å, and 50 layers of spinel CoO films each having a thickness of 4 Å. The making power at the time of film formation was 300 W on the Fe side and 200 W on the Co side. In the thus-obtained multi-layered film, the plane (400) was predominantly oriented in parallel with the substrate.

Figure 7:
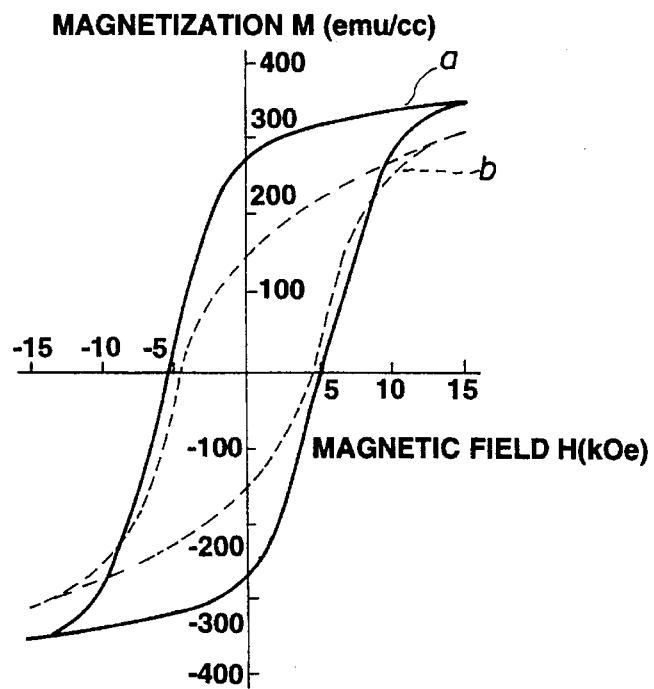
FIG. 7 shows the magnetization curve of the perpendicular magnetic film obtained in Example 4.

The multi-layered film was annealed in the air at a temperature of 350° C. for one hour-so as to oxidize $Fe_3O_4$ into $\gamma$-$Fe_2O_3$ and diffuse Co, thereby producing a Co-containing $\gamma$-$Fe_2O_3$ film. As a result of the X-ray diffraction of the Co-containing $\gamma$-$Fe_2O_3$ film obtained, the plane (400) was proved to predominantly orient in parallel with the substrate. The magnetization curve of the film is shown in FIG. 7. In FIG. 7, the solid line a shows the magnetization curve of the film to which a magnetic field was applied in the perpendicular direction, and the broken line b shows the magnetization curve of the film to which a magnetic field was applied in the in-plane direction. As shown in FIG. 7, since the residual magnetization and the coercive force of the solid line a were larger than those of the broken line b, the film was recognized as a perpendicular magnetic film. As to the magnetic characteristics of the perpendicular magnetic film, the saturation magnetization was 350 emu/cc (4400 G), the coercive force was 5.3 kOe and the squareness was 0.78. The spacing of the plane (400) was 2.077 Å, the optical absorption coefficient at 700 nm was 1.2 $\mu m^{-1}$ and the figure of merit at 700 nm was 3.8. Thus, the film was proved to be a good perpendicular magnetic film.

Example 5

A multi-layered film was produced in the same way as in Example 1 except that the laminated film was composed of 15 layers of spinel $Fe_3O_4$ films and 15 layers of spinel CoO films (total thickness: 700 Å).

The multi-layer film was annealed in the air at a temperature of 400° C. for one hour so as to oxidize $Fe_3O_4$ into $\gamma$-$Fe_2O_3$ and diffuse Co, thereby producing a Co-containing $\gamma$-$Fe_2O_3$ film. As a result of the X-ray diffraction of the Co-containing $\gamma$-$Fe_2O_3$ film obtained, the plane (400) was proved to predominantly orient in parallel with the substrate. From the observation of the magnetization curve of the film, it was found that the residual magnetization and the coercive force of the film to which a magnetic field was applied in the perpendicular direction were larger than those of the film to which a magnetic field was applied in the in-plane direction. Thus, the laminated film was recognized as a perpendicular magnetic film. As to the magnetic characteristics of the perpendicular magnetic film, the saturation magnetization was 318 emu/cc (4000 G), the coercive force was 5.7 kOe and the squareness was 0.75. The spacing of the plane (400) was 2.076 Å, the optical absorption coefficient at 700 nm was 1.7 $\mu m^{-1}$ and the figure of merit at 700 nm was 4.1. Thus, the film was proved to be a good perpendicular magnetic film in spite of the very thin film thickness.

Example 6

A multi-layered film produced in the same way as in Example 4 was annealed in the air at a temperature of 300° C. for 2 hours so as to oxidize $Fe_3O_4$ into $\gamma$-$Fe_2O_3$ and diffuse Co, thereby producing a Co-containing $\gamma$-$Fe_2O_3$ film. As a result of the X-ray diffraction of the Co-containing $\gamma$-$Fe_2O_3$ film obtained, the plane (400) was proved to predominantly orient in parallel with the substrate. From the observation of the magnetization curve of the film, it was found that the residual magnetization and the coercive force of the film to which a magnetic field was applied in the perpendicular direction were larger than those of the film to which a magnetic field was applied in the in-plane direction. Thus, the film was recognized as a perpendicular magnetic film. As to the magnetic characteristics of the perpendicular magnetic film, the saturation magnetization was 350 emu/cc (4400 G), the coercive force was 4.5 kOe and the squareness was 0.74. The spacing of the plane (400) was 2.079 Å, the optical absorption coefficient at 700 nm was 1.4 $\mu m^{-1}$. and the figure of merit at 700 nm was 3.7. Thus, the film was proved to be a good perpendicular magnetic film in spite of the very thin film thickness.

Comparative Example 1

A multi-layered film was produced in the same way as in Example 1 except that the thickness of the spinel $Fe_3O_4$ film was 130 Å, that the thickness of the spinel CoO film was 24 Å (the molar ratio of Co to Fe was 0.28), that the thickness of one unit was 154 Å, and that the film was composed of 30 layers of spinel $Fe_3O_4$ films and 30 layers of spinel CoO films. The X-ray diffraction spectrum of the multi-layered film obtained is shown in FIG. 1a. As shown in FIG. 1a, the plane (222) was proved to predominantly orient in parallel with the substrate.

By using the multi-layered film obtained, a spinel oxide film was produced in the same way as in Example 1. As a result of the X-ray diffraction of the spinel oxide film obtained, the plane (222) was proved to predominantly orient in parallel with the substrate. From the observation of the magnetization curve of the spinel oxide film, it was found that the residual magnetization and the coercive force of the film to which a magnetic field was applied in the in-plane direction were larger than those of the film to which a magnetic field was applied in the perpendicular direction. Thus, it was proved that the film was not a perpendicular magnetic film.

Comparative Example 2

A multi-layered film was produced in the same way as in Example 1 except that the thickness of the spinel $Fe_3O_4$ film was 36 Å, that the thickness of the spinel CoO film was 17 Å (the molar ratio of Co to Fe was 0.69), that the thickness of one unit was 53 Å, and that the film was composed of 60 layers of spinel $Fe_3O_4$ films and 60 layers of spinel CoO films. The X-ray diffraction spectrum of the multi-layered film obtained is shown in FIG. 1b. As shown in FIG. 1b, the plane (400) was proved to predominantly orient in parallel with the substrate.

By using the multi-layered film obtained, a spinel oxide film was produced in the same way as in Example 1. As a result of the X-ray diffraction of the spinel oxide film obtained, the plane (400) was proved to predominantly orient in parallel with the substrate. From the observation of the magnetization curve of the spinel oxide film, it was found that the residual magnetization and the coercive force of the film to which a magnetic field was applied in the in-plane direction were larger than those of the film to which a magnetic field was applied in the perpendicular direction. Thus, it was proved that the film was not a perpendicular magnetic film.

Example 7

In a high-frequency high-rate sputtering device SH-250H-T06 (manufactured by Nihon Shinku Corp.) a glass substrate was placed with a distance of 80 mm from an Ni target at room temperature. Reactive sputtering was first carried out by using the Ni target in an atmosphere of argon and oxygen under a partial oxygen pressure of 0.11 mTorr and the total pressure of 5 mTorr at a deposition rate of 40 Å/min, thereby forming an NaCl-type NiO film on the glass substrate to a thickness of 1000 Å as a primary layer. As a result of the X-ray diffraction of the NiO film obtained, the plane (100) was proved to predominantly orient in parallel with the substrate. A multi-layered film was produced on the NiO film in the same way as in Example 1 except that the thickness of the spinel $Fe_3O_4$ film was 390 Å, that the thickness of the spinel CoO film was 72 Å (the molar ratio of Co to Fe was 0.26), that the thickness of one unit was 462 Å, and that the laminated film was composed of 5 layers of spinel $Fe_3O_4$ films and 5 layers of spinel CoO films.

Figure 8:
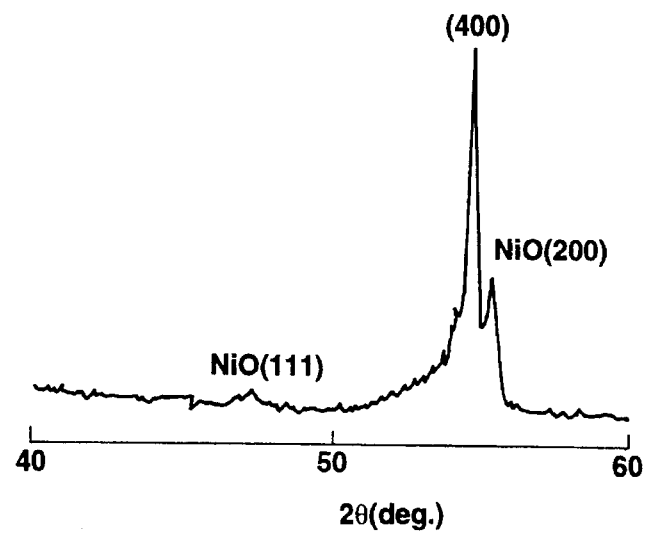
FIG. 8 shows X-ray diffraction spectrum of multi-layer films obtained in Example 7.

The X-ray diffraction spectrum of the multi-layered film obtained is shown in FIG. 8. As shown in FIG. 8, the plane (400) was proved to predominantly orient in parallel with the substrate.

The multi-layered film was annealed in the air at a temperature of 400° C. for one hour so as to oxidize $Fe_3O_4$ into $\gamma$-$Fe_2O_3$ and diffuse Co, thereby producing a Co-containing $\gamma$-$Fe_2O_3$ film having the NiO film as the primary layer. As a result of the X-ray diffraction of the Co-containing $\gamma$-$Fe_2O_3$ film obtained, the plane (400) was proved to predominantly orient in parallel with the substrate. From the observation of the magnetization curve of the Co-containing $\gamma$-$Fe_2O_3$, the film was recognized as a perpendicular magnetic film. As to the magnetic characteristics of the perpendicular magnetic film, the saturation magnetization was 350 emu/cc (4400 G), the coercive force was 5.4 kOe and the squareness was 0.81. The spacing of the plane (400) was 2.081 Å, the optical absorption coefficient at 700 nm was 1.9 $\mu m^{-1}$, and the figure of merit at 700 nm was 4.0. Thus, the film was proved to be a good perpendicular magnetic film.

Example 8

In a high-frequency high-rate sputtering device SH-250H-T06 (manufactured by Nihon Shinku Corp.) a glass substrate was placed with a distance of 80 mm from targets and the substrate temperature was held at a temperature of 280° C. Reactive sputtering was first carried out by using an Fe target in an atmosphere of argon and oxygen under a partial oxygen pressure of 0.11 mTorr and the total pressure of 5 mTorr at a deposition rate of 40 Å/min, thereby forming a spinel $Fe_3O_4$ film on the glass substrate to a thickness of 400 Å as a first layer. The shutter was next rotated to form an oxide layer containing Co and Mn (the molar ratio of Mn to Co was 0.08) to a thickness of 8 Å as a second layer by sputtering at a deposition rate of 42 Å/min. The first layer and the second layer constituted one unit having a thickness of 48 Å. The molar ratio of Co to Fe in one unit was 0.26. These operations were alternately repeated 100 times to obtain a laminated film composed of 50 layers of spinel $Fe_3O_4$ films each having a thickness of 40 Å, and 50 layers of oxide layers containing Co and Mn each having a thickness of 8 Å. The making power at the time of film formation was 300 W on the Fe side and 300 W on the Co-Mn side. As a result of the X-ray diffraction of the thus-obtained multi-layer film, the plane (400) was proved to predominantly orient in parallel with the substrate.

Figure 9:
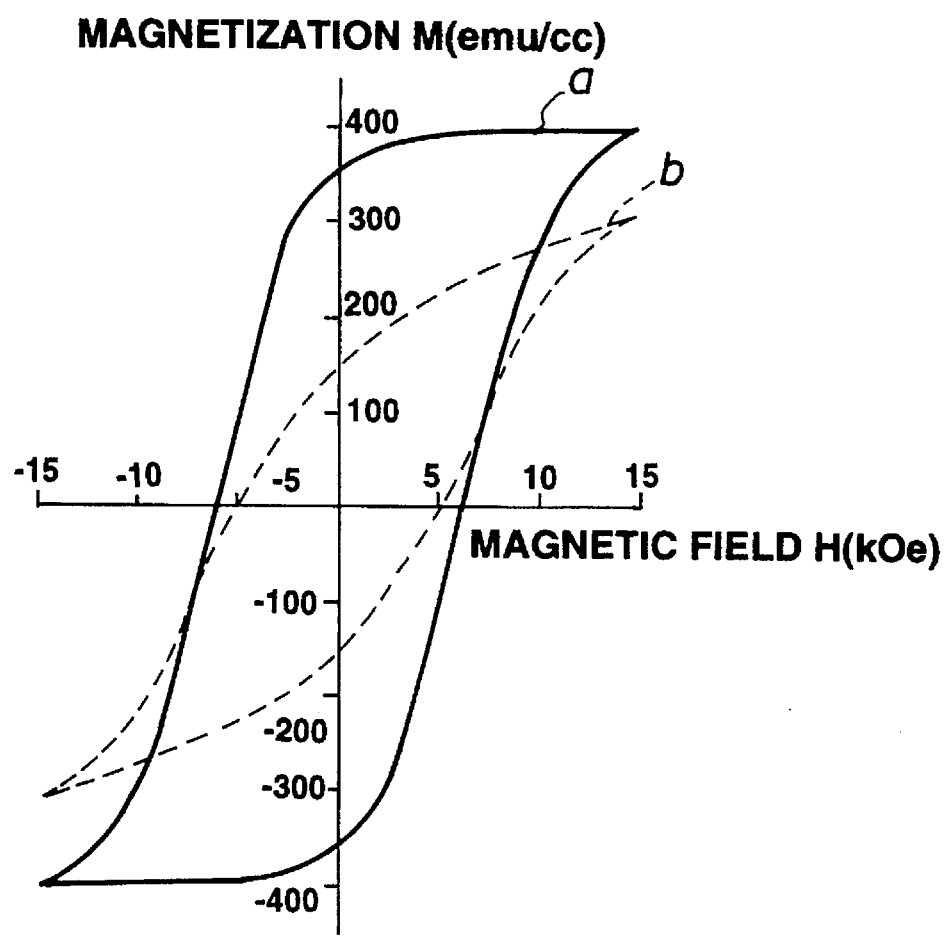
FIG. 9 shows the magnetization curve of the perpendicular magnetic film obtained in Example 8.

The multi-layered film was annealed in the air at a temperature of 450° C. for one hour so as to oxidize $Fe_3O_4$ into $\gamma$-$Fe_2O_3$ and diffuse Co and Mn, thereby producing a Co-Mn-containing $\gamma$-$Fe_2O_3$ film. As a result of the X-ray diffraction of the Co-Mn-containing $\gamma$-$Fe_2O_3$ film obtained, the plane (400) was proved to predominantly orient in parallel with the substrate. The magnetization curve of the Co-Mn-containing $\gamma$-$Fe_2O_3$ film is shown in FIG. 9. In FIG. 9, the solid line a shows the magnetization curve of the film to which a magnetic field was applied in the perpendicular direction, and the broken line b shows the magnetization curve of the film to which a magnetic field was applied in the in-plane direction. As shown in FIG. 9, since the residual magnetization and the coercive force of the solid line a were larger than those of the broken line b, the film was recognized as a perpendicular magnetic film. As to the magnetic characteristics of the perpendicular magnetic film, the saturation magnetization was 340 emu/cc (4250 G), the coercive force was 6.3 kOe and the squareness was 0.90. The spacing of the plane (400) was 2.082 Å, the optical absorption coefficient at 700 nm was 2.1 $\mu m^{-1}$ and the figure of merit at 700 nm was 2.9. Thus, the film was proved to be a good perpendicular magnetic film.

Example 9

In a high-frequency high-rate sputtering device SH-250H-T06 (manufactured by Nihon Shinku Corp.) a glass substrate was placed with a distance of 80 mm from an Ni target at room temperature. Reactive sputtering was first carried out by using the Ni target in an atmosphere of argon and oxygen under a partial oxygen pressure of 0.11 mTorr and the total pressure of 5 mTorr at a deposition rate of 40 Å/min, thereby forming an NaCl-type NiO film on the glass substrate to a thickness of 1000 Å as a primary layer. As a result of the X-ray diffraction of the NiO film obtained, the plane (100) was proved to predominantly orient in parallel with the substrate. A multi-layered was formed on the NiO film in the same way as in Example 1 except that a spinel $Fe_3O_4$ film having a thickness of 200 Å and an oxide layer containing Co and Mn (the molar ratio of Mn to Co was 0.08) and having a thickness of 41 Å constituted one unit having a thickness of 241 Å, that the molar ratio of Co to Fe in one unit was 0.26, and that the laminated film was composed of 10 layers of spinel $Fe_3O_4$ films each having a thickness of 200 Å and 10 layers of oxide layer containing Co and Mn having a thickness of 41 Å.

Figure 10:
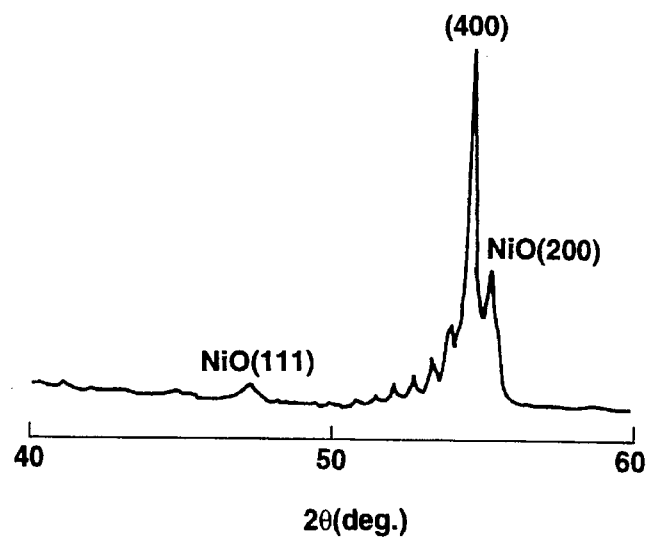
FIG. 10 shows X-ray diffraction spectrum of multi-layer films obtained in Example 9.

The X-ray diffraction spectrum of the multi-layered film obtained is shown in FIG. 10. As shown in FIG. 10, the plane (400) was proved to predominantly orient in parallel with the substrate.

The multi-layered film was annealed in the air at a temperature of 400° C. for one hour so as to produce a Co-Mn-containing $\gamma$-$Fe_2O_3$ film having the NiO film as the primary layer. As a result of the X-ray diffraction of the film obtained, the plane (400) was proved to predominantly orient in parallel with the substrate. From the observation of the magnetization curve of the film, the film was recognized as a perpendicular magnetic film. As to the magnetic characteristics of the perpendicular magnetic film, the saturation magnetization was 346 emu/cc (4350 G), the coercive force was 6.3 kOe and the squareness was 0.95. The spacing of the plane (400) was 2.081 Å, the optical absorption coefficient at 700 nm was 2.1 $\mu m^{-1}$ and the figure of merit at 700 nm was 2.9. Thus, the film was proved to be a good perpendicular magnetic film.

Example 10

Figure 11:
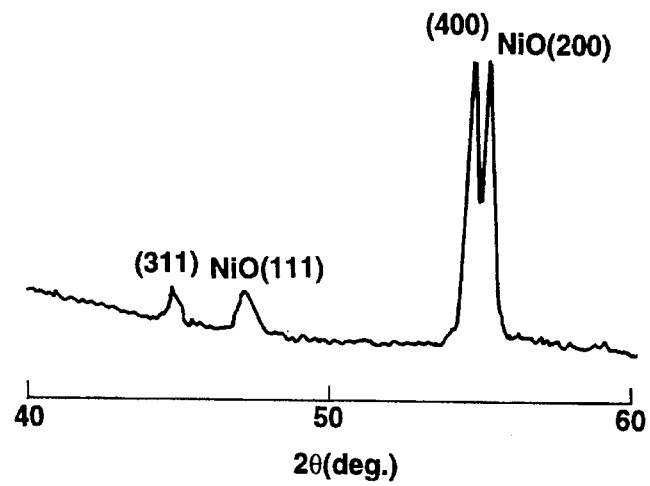
FIG. 11 shows X-ray diffraction spectrum of multi-layer films obtained in Example 10.

In a high-frequency high-rate sputtering device SH-250H-T06 (manufactured by Nihon Shinku Corp.) a glass substrate was placed with a distance of 80 mm from an Ni target and the substrate temperature was held at 25° to 100 ° C. Reactive sputtering was first carried out by using the Ni target in an atmosphere of argon and oxygen under a partial oxygen pressure of 0.11 mTorr and the total pressure of 5 mTorr at a deposition rate of 40 Å/min, thereby forming an NaCl-type NiO film on the glass substrate to a thickness of 1000 Å as a primary layer. As a result of the X-ray diffraction of the NiO film obtained, the plane (100) was proved to predominantly orient in parallel with the substrate. A monolayer of Co-containing $Fe_3O_4$ film (the molar ratio of Co to Fe was measured to be 0.26 as a result of composition analysis) having a thickness of 2000 Å was formed on the NiO film by sputtering an Fe-Co alloy target in an atmosphere of argon and oxygen under a partial oxygen pressure of 0.10 mTorr and the total pressure of 5 mTorr at a deposition rate of 40 Å/min. The making power at the time of film formation was 300 W. The X-ray diffraction spectrum of the monolayer film obtained is shown in FIG. 11. As shown in FIG. 11, the plane (400) was proved to predominantly orient in parallel with the substrate. When the magnetization curve of Co-containing $Fe_3O_4$ film was measured, the film was recognized as an in-plane magnetic film.

Figure 12:
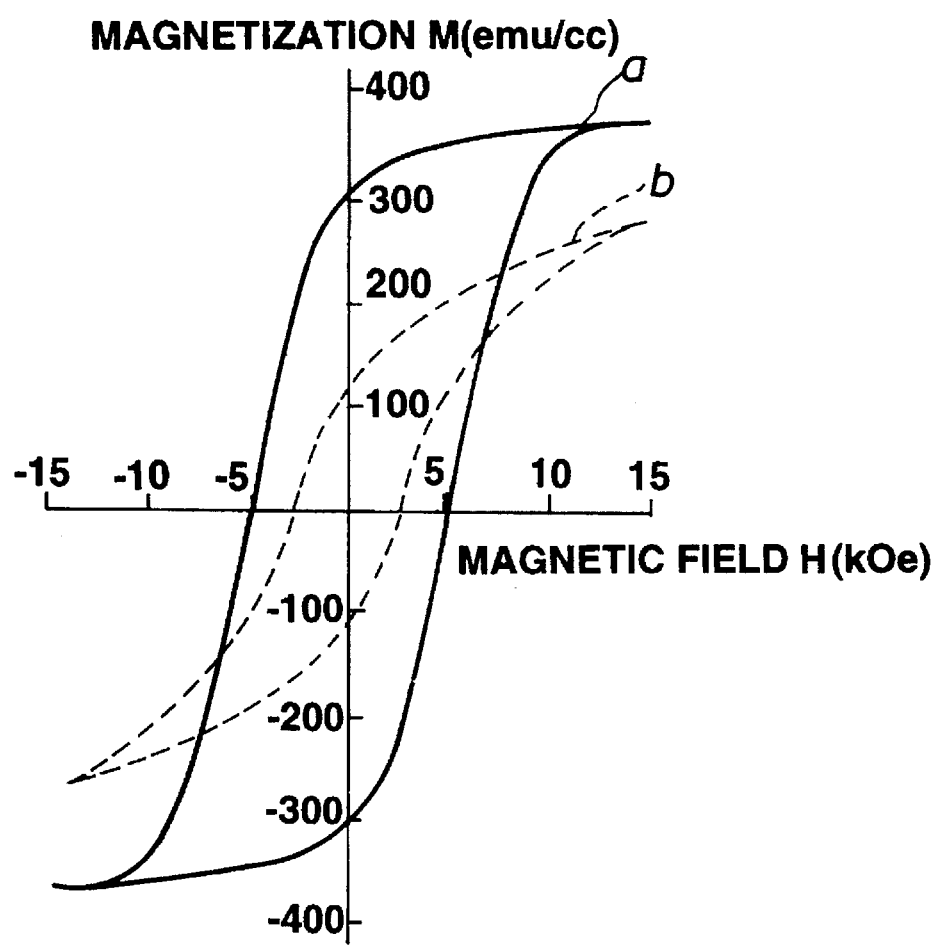
FIG. 12 shows the magnetization curve of the perpendicular magnetic film obtained in Example 10.

The monolayer film was annealed in the air at a temperature of 400° C. for 2 hours so as to produce a Co-containing $\gamma$-$Fe_2O_3$ film having the NiO film as the primary layer. As a result of the X-ray diffraction of the film obtained, the plane (400) was proved to predominantly orient in parallel with the substrate. The magnetization curve of the Co-containing $\gamma$-$Fe_2O_3$ film is shown in FIG. 12. In FIG. 12, the solid line a shows the magnetization curve of the film to which a magnetic field was applied in the perpendicular direction, and the broken line b shows the magnetization curve of the film to which a magnetic field was applied in the in-plane direction. As shown in FIG. 12, since the residual magnetization and the coercive force of the solid line a were larger than those of the broken line b, it was proved that the monolayer film of Co-containing $Fe_3O_4$ film was transformed into a perpendicular magnetic film (Co-containing $Fe_3O_4$ was transformed into Co-containing $\gamma$-$Fe_2O_3$) by annealing. As to the magnetic characteristics of the perpendicular magnetic film, the saturation magnetization was 358 emu/cc (4200 G), the coercive force was 5.4 kOe and the squareness was 0.82. The spacing of the plane (400) was 2.082 Å, the optical absorption coefficient at 700 nm was 1.9 $m^{-1}$ and the figure of merit at 700 nm was 4.0. Thus, the film was proved to be a good perpendicular magnetic film.

What is claimed is:

1. A perpendicular magnetic emisotropy thin film comprising a Co-containing $\gamma$-$Fe_2O_3$ film formed on a substrate, in which the plane (400) of the Co-containing $\gamma$-$Fe_2O_3$ film is predominantly oriented parallel with said substrate, the molar ratio of Co to Fe is between 0.01 and 0.32, the spacing of said plane (400) is not more than 2.084 Å, and the optical absorption coefficient of the thin film at 700 nm is not more than 2.5 $\mu m^{-1}$.

2. The perpendicular magnetic anisotropy thin film according to claim 1, wherein said Co-containing $\gamma$-$Fe_2O_3$ film formed on said substrate, in which said plane (400) of the Co-containing $\gamma$-$Fe_2O_3$ film is predominantly oriented parallel with said substrate, contains 0.01 to 0.25 mol of Mn based on 1 mol of Co.

3. A multi-layered film for a perpendicular magnetic anisotropy thin film, comprising not less than three units formed on a substrate, each unit being composed of an $Fe_3O_4$ layer and a CoO layer, in which the plane (400) of the $Fe_3O_4$ layer and the CoO layer is predominantly oriented parallel with said substrate, the thickness of each unit is not more than 130 Å and the molar ratio of Co to Fe is between 0.01 and 0.32, and the $Fe_3O_4$ layer and the CoO layer are stacked one upon the other on the surface of the substrate.

4. The perpendicular magnetic anisotropy thin film obtained by annealing a multi-layered film of claim 3 at a temperature of 280° to 450° C., wherein said multilayered film comprises not less than three units formed on a substrate, each unit being composed of an $Fe_3O_4$ layer and a CoO layer, in which the plane (400) of the $Fe_3O_4$ and the CoO is predominantly oriented parallel with said substrate, the thickness of each unit is not more than 130 Å and the molar ratio of Co to Fe is between 0.01 an 0.32, and the $Fe_3O_4$ layer and the CoO layer are stacked one upon the other on the surface of the substrate.

5. A perpendicular magnetic anisotropy thin film comprising:

a primary layer of an NiO film formed on a substrate, in which the plane (100) of the NiO film is predominantly oriented parallel with said substrate; and a Co-containing $\gamma$-$Fe_2O_3$ film formed on said primary layer, in which the plane (400) of the Co-containing $\gamma$-$Fe_2O_3$ film is predominantly oriented parallel with said substrate, the molar ratio of Co to Fe is between 0.10 and 0.32, the spacing of said plane (400) is not more than 2.084 Å, and the optical absorption coefficient of said Co-containing $\gamma$-$Fe_2O_3$ film at 700 nm is not more than 2.5 $\mu m^{-1}$.

6. The perpendicular magnetic anisotropy thin film according to claim 5, obtained by annealing a multi-layered film at a temperature of 280° to 450° C., wherein said multi-layered film comprises a primary layer of an NiO film formed on a substrate, in which the plane (100) of the NiO film is predominantly oriented in parallel with said substrate; and not less than two units formed on said primary layer, each unit being composed of an $Fe_3O_4$ layer and a CoO layer, in which the plane (400) of the $Fe_3O_4$ layer and the CoO layer is predominantly oriented parallel with said substrate, the thickness of each unit is not more than 800 Å, and the molar ratio of Co to Fe is between 0.10 and 0.32, and the $Fe_3O_4$ layer and the CoO layer are next to each other on the surface of the substrate.

7. A multi-layered film for a perpendicular magnetic anisotropy thin film, comprising:

a primary layer of an NiO film formed on a substrate, in which the plane (100) of the NiO film is predominantly oriented in parallel with said substrate; and not less than two units formed on said primary layer, each unit being composed of an $Fe_3O_4$ layer and a CoO layer, in which the plane (400) of the $Fe_3O_4$ layer and the CoO layer is predominantly oriented parallel with said substrate, the thickness of each unit is not more than 800 Å, and the molar ratio of Co to Fe is between 0.10 and 0.32, and the $Fe_3O_4$ layer and the CoO layer are stacked one upon the other on the substrate.

8. A multi-layered film for a perpendicular magnetic anisotropy thin film, comprising not less than three units formed on a substrate, each unit being composed of an $Fe_3O_4$ layer and an oxide layer containing Co and Mn, in which the plane (400) of the $Fe_3O_4$ layer and the oxide layer containing Co and Mn is predominantly oriented parallel with said substrate, the molar ratio of Mn to Co is between 0.01 and 0.25, the molar ratio of Co to Fe is between 0.01 and 0.32 and the thickness of each unit is not more than 130 Å, and the $Fe_3O_4$ layer and the oxide layer containing Co and Mn are stacked one upon the other on the substrate.

9. A perpendicular magnetic anisotropy thin film obtained by annealing a multi-layered film of claim 8 at a temperature of 280° to 450° C., wherein said multilayered film comprises not less than three units formed on a substrate, each unit being composed of an $Fe_3O_4$ layer and an oxide layer containing Co and Mn, in which the plane (400) of the $Fe_3O_4$ layer and the oxide layer containing Co and Mn is predominantly oriented parallel with said substrate, the molar ratio of Mn to Co is between 0.01 and 0.25, the molar ratio of Co to Fe is between 0.01 and 0.32 and the thickness of each unit is not more than 130 Å, and the $Fe_3O_4$ layer and the oxide layer containing Co and Mn are stacked one upon the other on the substrate.

10. A perpendicular magnetic anisotropy thin film comprising:

a primary layer of an NiO film formed on a substrate, in which the plane (100) of the NiO film is predominantly oriented parallel with said substrate; and a Co-Mn-containing $\gamma$-$Fe_2O_3$ film formed on said primary layer, in which the plane (400) of the Co-Mn-containing $\gamma$-$Fe_2O_3$ film is predominantly oriented parallel with said substrate, the molar ratio of Co to Fe is between 0.10 and 0.32, the molar ratio of Mn to Co is between 0.01 and 0.25, the spacing of said plane (400) is not more than 2.084 Å, and the optical absorption coefficient of the Co-Mn-containing $\gamma$-$Fe_2O_3$ film at 700 nm is not more than 2.5 $\mu m^{-1}$.

11. A multi-layered film for a perpendicular magnetic anisotropy thin film, comprising:

a primary layer of an NiO film formed on a substrate, in which the plane (100) of the NiO film is predominantly oriented in parallel with said substrate; and not less than two units formed on said primary layer, each unit being composed of an $Fe_3O_4$ layer and an oxide layer containing Co and Mn, in which the plane (400) of the $Fe_3O_4$ layer and an oxide layer containing Co and Mn is predominantly oriented parallel with said substrate, the thickness of each unit is not more than 800 Å, the molar ratio of Co to Fe is between 0.10 and 0.32, and the molar ratio of Mn to Co is between 0.01 and 0.25, and the $Fe_3O_4$ layer and the oxide layer containing Co and Mn are stacked one upon the other on the surface of the substrate.

12. The perpendicular magnetic anisotropy thin film obtained by annealing a multi-layered film of claim 11 at a temperature of 280° to 450° C., wherein the multilayered film comprises a primary layer of an NiO film formed on a substrate, in which the plane (100) of the NiO film is predominantly oriented in parallel with said substrate; and not less than two units formed on said primary layer, each unit being composed of an $Fe_3O_4$ layer and an oxide layer containing Co and Mn, in which the plane (400) of the $Fe_3O_4$ layer and an oxide layer containing Co and Mn is predominantly oriented parallel with said substrate, the thickness of each unit is not more than 800 Å, the molar ratio of Co to Fe is between 0.10 and 0.32, and the molar ratio of Mn to Co is between 0.01 and 0.25, and the $Fe_3O_4$ layer and the oxide layer containing Co and Mn are stacked one upon the other on the substrate.

* * * * *